(12) United States Patent
Lee

(10) Patent No.: US 7,256,402 B1
(45) Date of Patent: Aug. 14, 2007

(54) FLAT PANEL X-RAY IMAGER WITH A GRID STRUCTURE

(76) Inventor: Denny Lee, 1009 Saber Rd., West Chester, PA (US) 19382

( * ) Notice: Subject to any disclaimer, the term of this patent is extended or adjusted under 35 U.S.C. 154(b) by 119 days.

(21) Appl. No.: 11/103,320

(22) Filed: Apr. 11, 2005

Related U.S. Application Data

(60) Provisional application No. 60/588,513, filed on Jul. 15, 2004, provisional application No. 60/562,747, filed on Apr. 15, 2004.

(51) Int. Cl.
*G01T 1/24* (2006.01)
(52) U.S. Cl. .................................. 250/370.09
(58) Field of Classification Search .......... 250/370.09, 250/370.08, 370.11
See application file for complete search history.

(56) References Cited

U.S. PATENT DOCUMENTS

| | | | |
|---|---|---|---|
| 5,319,206 A | | 6/1994 | Lee et al. |
| 5,729,021 A | * | 3/1998 | Brauers et al. ........ 250/370.09 |
| 5,880,472 A | * | 3/1999 | Polischuk et al. ..... 250/370.09 |
| 6,121,622 A | * | 9/2000 | Beyne et al. ............... 250/374 |
| 6,437,339 B2 | | 8/2002 | Lee et al. |

OTHER PUBLICATIONS

Pang, G., "Electronic Portal Imaging With An Avalanche-Multiplication-Based Video Camera," Med. Phys. 27 (4), Apr. 2000, pp. 676-684 (2000).
Hunt, Dylan C., et al., "An Experimentally Validated Theoretical Model of Avalanche Multiplication X-ray Noise in Amorphous Selenium," In Medical Imaging 2000: Physics of Medical Imaging, Proc. SPIE 3977, pp. 106-116 (2000).

* cited by examiner

*Primary Examiner*—David Porta
*Assistant Examiner*—Mark R. Gaworecki
(74) *Attorney, Agent, or Firm*—Caesar, Rivise, Bernstein, Cohen & Pokotilow, Ltd.

(57) ABSTRACT

A flat panel X-ray imager using an amorphous selenium detector which uses a polymer grid structure within the X-ray conversion layer to form an interface between the X-ray conversion layer and the pixel electrodes. The grid structure provides an additional physical barrier between pixel electrodes that reduces electrical bridging due to crystallization of the amorphous selenium due to temperature increases while also reducing the delamination temperature by providing a good anchor to the selenium, as well as a "cushion" for thermal expansion or contraction of the pixel electrodes. The grid can further include one or more grid electrodes for effecting avalanche-gain within the X-ray conversion layer while minimizing dark current entry into the selenium layer from the pixel electrode.

30 Claims, 14 Drawing Sheets

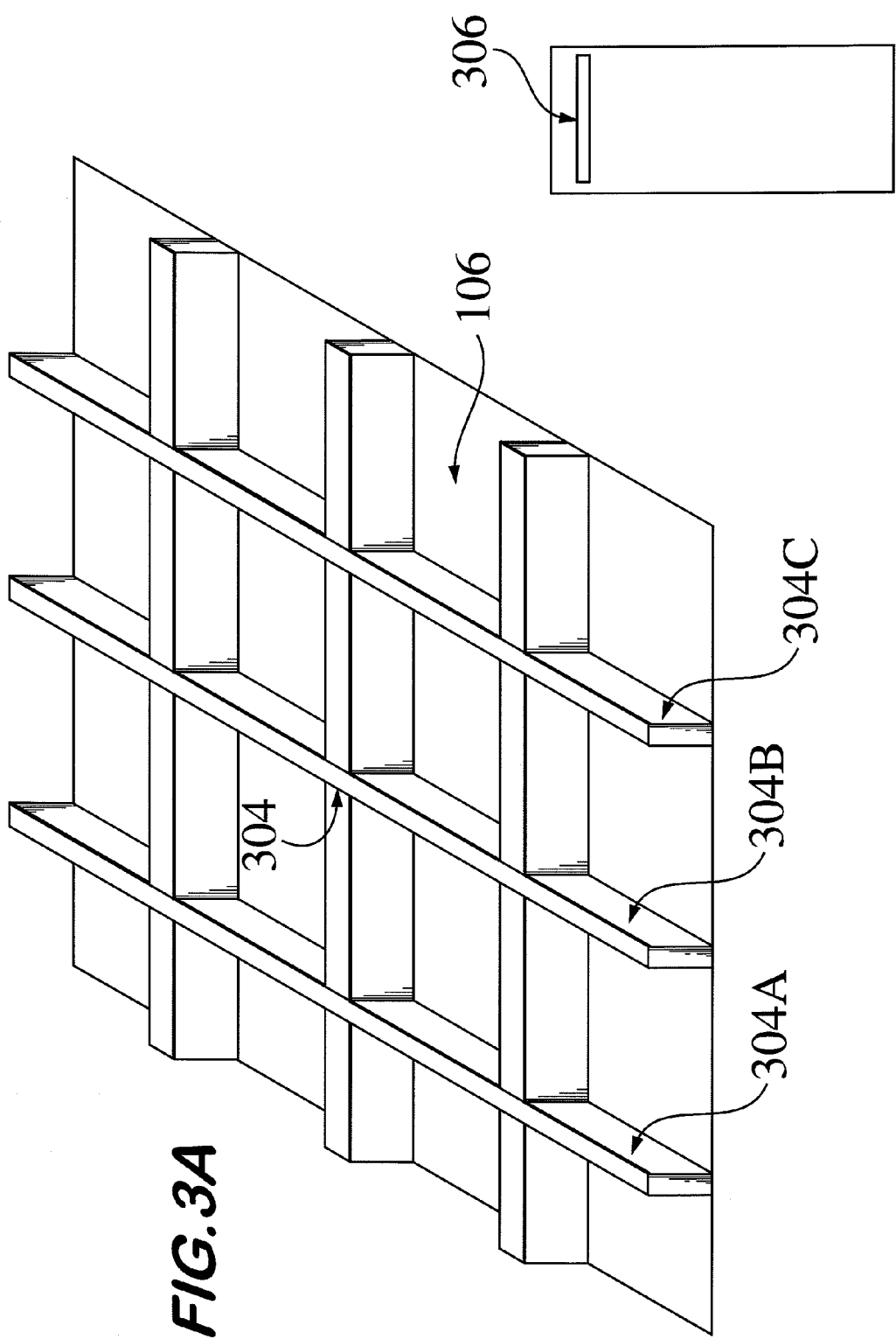

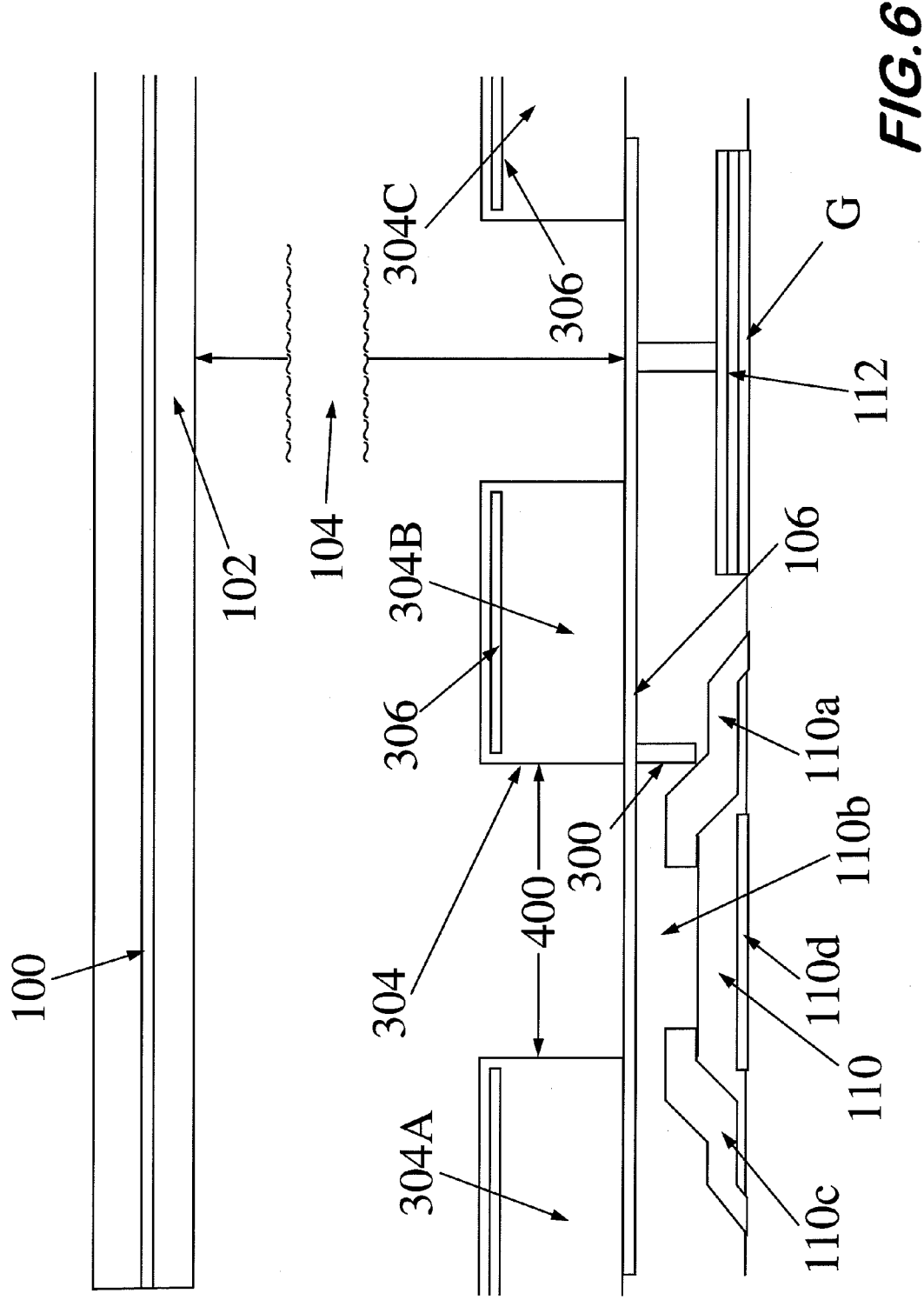

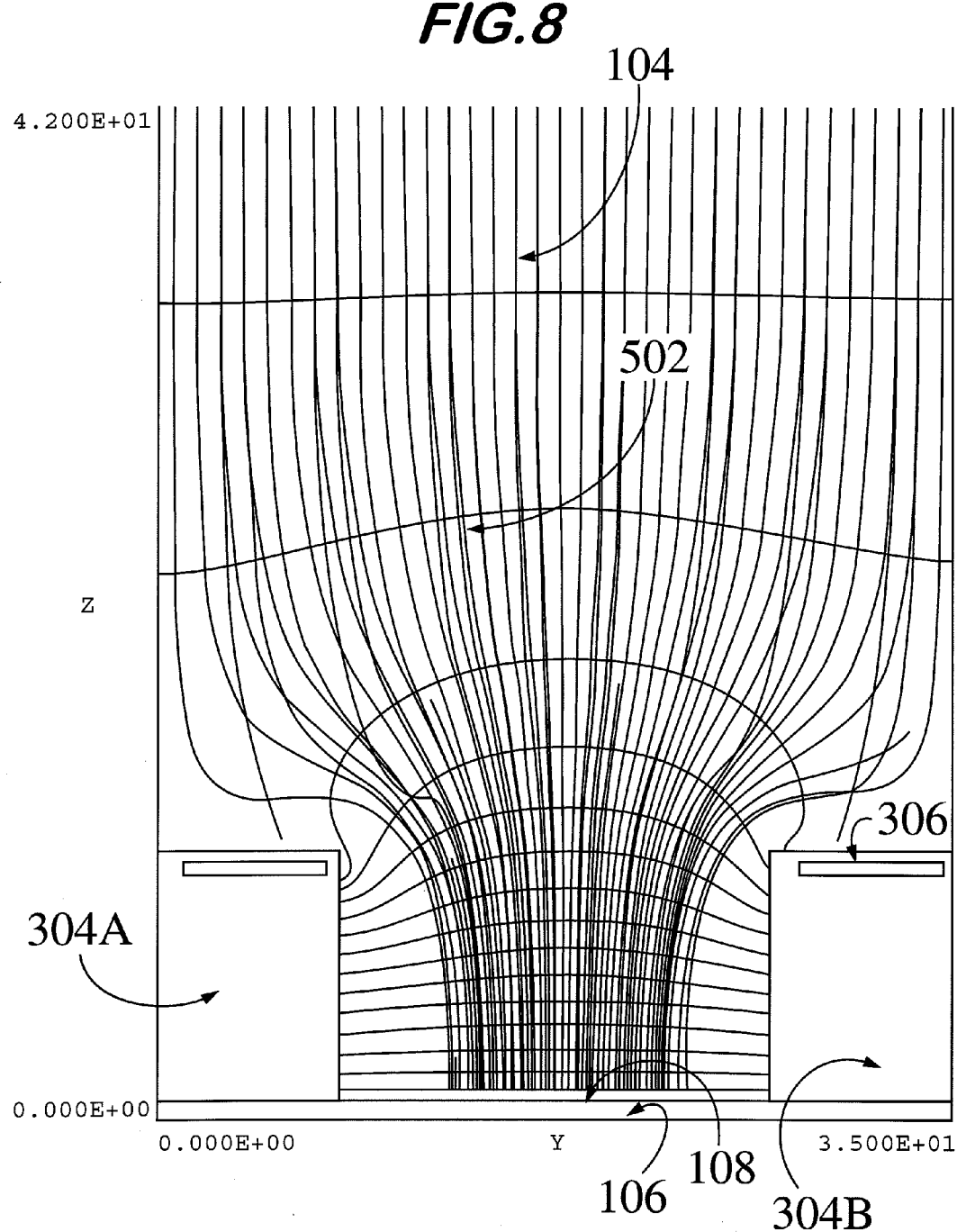

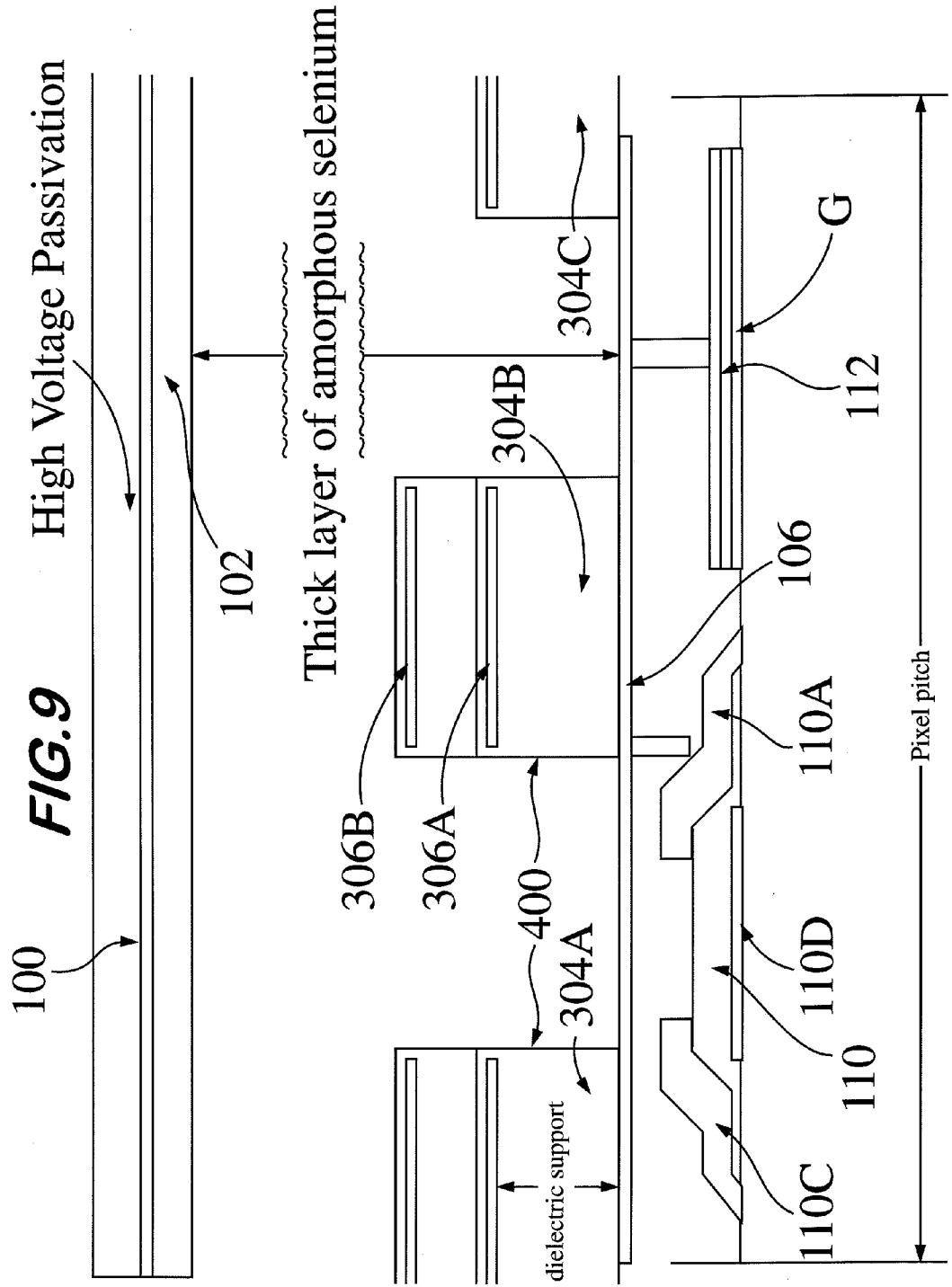

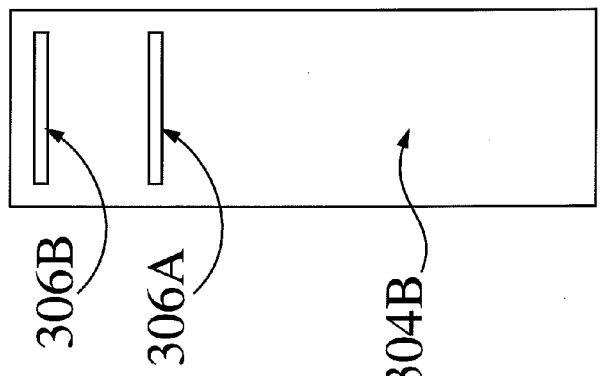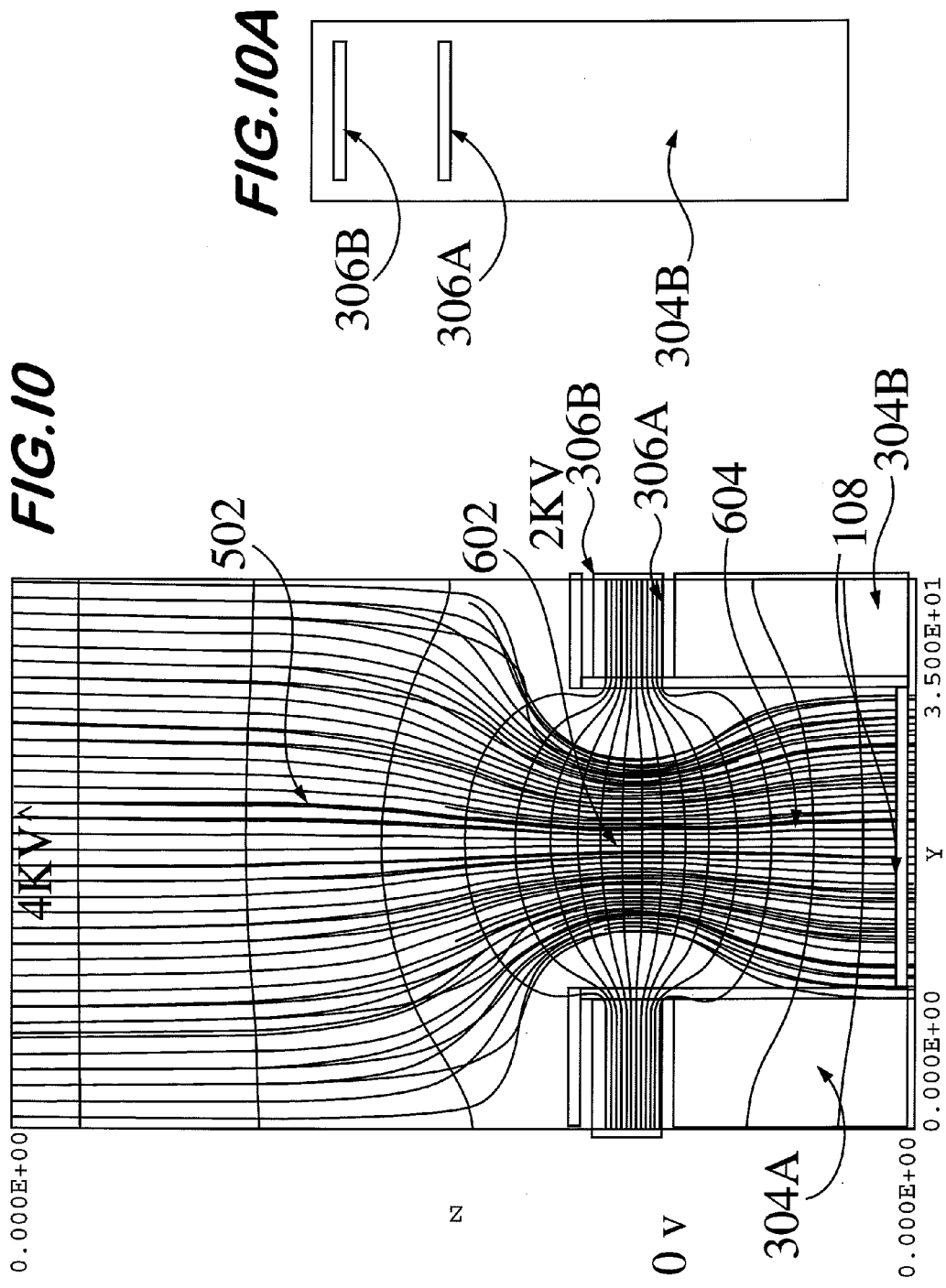

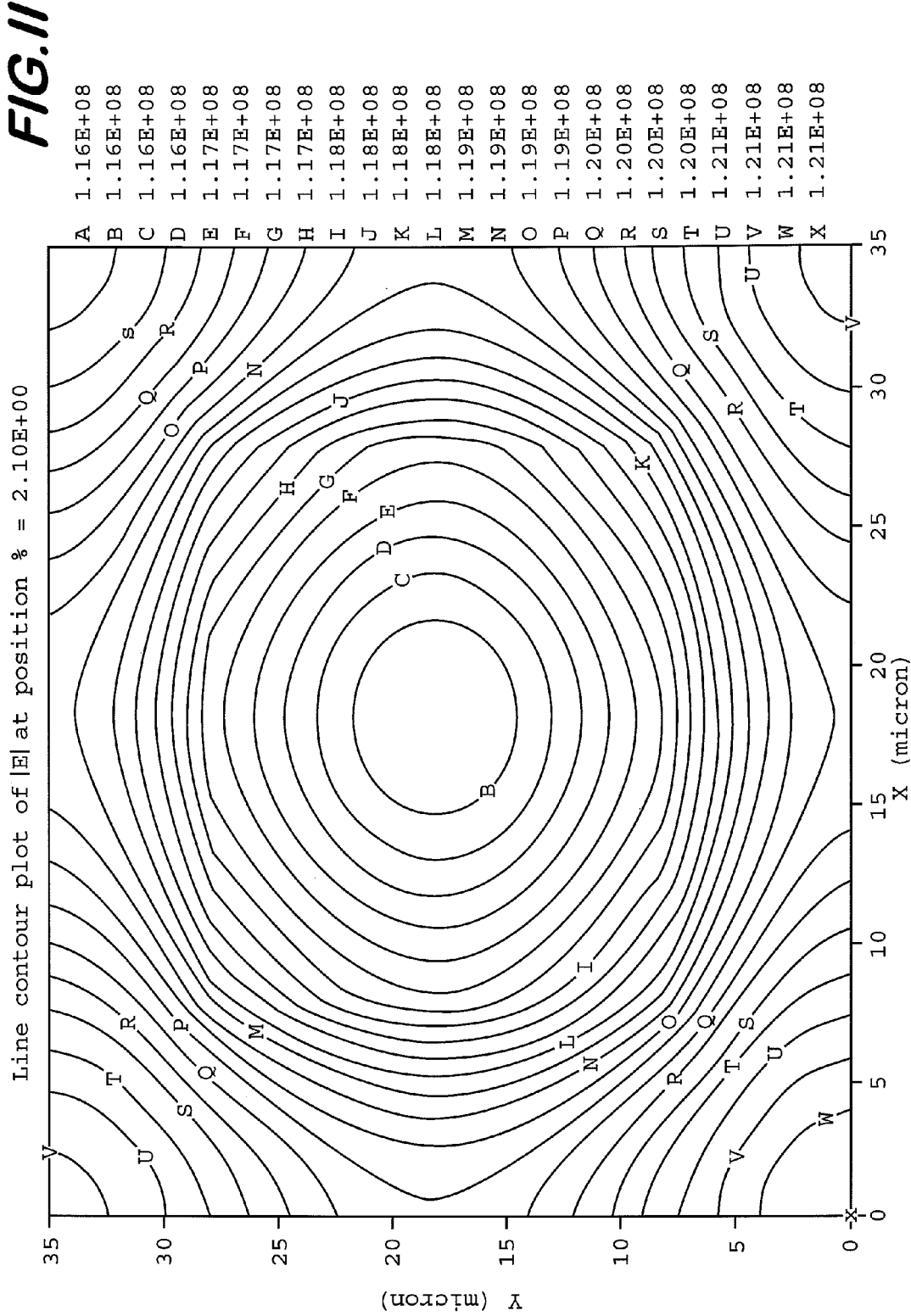

FLAT PANEL X-RAY IMAGER WITH A GRID STRUCTURE

CROSS-REFERENCE TO RELATED APPLICATIONS

This application is non-provisional application of, and claims the benefit under 35 U.S.C. §119(e) of, A. Ser. No. 60/562,747 filed on Apr. 15, 2004 entitled FLAT PANEL X-RAY IMAGER WITH INTEGRAL GAIN LAYER IN THE PHOTODETECTOR and also claims the benefit under 35 U.S.C. §119(e) of, A. Ser. No. 60/588,513 filed on Jul. 15, 2004 entitled FLAT PANEL X-RAY IMAGER WITH AVALANCHE GAIN LAYER IN THE PHOTODETECTOR, and all of whose entire disclosures are incorporated by reference herein.

BACKGROUND OF THE INVENTION

1. Field of Invention

This patent specification is in the field of radiography and pertains more specifically to x-ray imaging using a digital flat panel detector.

2. Description of Related Art

Flat panel x-ray imaging devices that generate electrical signals related to local x-ray exposure have been developed in recent years. An example is discussed in U.S. Pat. No. 5,319,206, the entire disclosure of which is hereby incorporated by reference herein. An improvement involving the use of a gain layer is disclosed in U.S. Pat. No. 6,437,339, the entire disclosure of which is also incorporated by reference herein. These examples are direct conversion panels, in which x-ray photons are directly converted to electron-hole pairs and thus into electrical signals, and differ in this respect from indirect conversion panels in which x-ray photons are first converted to light and the light is then converted to electrical signals. It is believed that direct conversion panels have a number of advantages, including better spatial resolution.

Direct conversion flat panel x-ray imaging devices offer good spatial resolution and dynamic range properties and can replace x-ray film in a variety of radiographic procedures, such as, without limitation, chest x-ray imaging and mammography. However, there typically is a balance between x-ray dose and image quality. It is desirable in general to limit x-ray dose to the level that would just give the requisite image quality. Such panels typically use an amorphous Selenium (a-Se) based layer in which the incoming x-ray energy is converted to electron-hole pairs. An electric potential across the a-Se layer and a thin-film transistor array are used to derive the electrical signal representing the spatial distribution of the x-ray energy impinging on the panel.

One way to improve the conversion efficiency and thus the signal-to-noise ratio (SNR) for a given energy of x-rays impinging in a-Se conversion layers is to increase the electrical field sufficiently to create an avalanche effect, in which an x-ray photon is likely to generate multiple electron-hole pairs. See e.g. G. Pang, "Electronic portal imaging with an avalanche-multiplication-based video camera,: Med. Phys. 27 (4), 676-684 (2000). However, it is believed that an electric field of approximately 75 Volts per micrometer (75V/μm) or more in the a-Se layer is required to initiate and maintain the avalanche effect. While this is practical in a thin layer of a-Se, it becomes less so in the thickness typically used for medical imaging, which is 200-500 μm. To create a 75V/μm field in a 200 μm thick a-Se layer would require applying 15,000 Volts across the a-Se layer, and for a 500 μm layer would require 37,500 Volts. These voltages are difficult to accommodate in a medical device. Even more important, when the entire 200 μm or 500 μm a-Se layer is operating in the avalanche mode, an additional error is introduced because the number of electron-hole pairs that an x-ray photon would generate depends on the depth in the layer at which the first pair was generated. See e.g. D. Hunt, B. Lui, and J. A. Rowlands, "An Experimentally Validated Theoretical Model of Avalanche Multiplication X-ray Noise in Amorphous Selenium," in *Medical Imaging* 2000: *Physics of Medical Imaging*, Proc. SPIE 3977. 106-116 (2000).

The earlier-cited patent (U.S. Pat. No. 6,437,339) discloses an approach in which an avalanche effect would be achieved in a thin layer of a material different from the a-Se layer that converts the x-ray energy to electron-hole pairs. This thin layer can be a gas of a solid material that has a much smaller x-ray absorption cross-section than the a-Se layer and a negligible depth-dependent gain. However, it is difficult in practice to build a suitable gas chamber or a solid material that as the requisite properties. Other efforts to improving conversion efficiency have focused on using different conversion materials, such as PbO and HgI, or using indirect conversion relying on CsI on avalanche Se, or attacking the challenge of improved SNR by providing in-pixel amplifiers, or tiled CMOS with CsI or Selenium. However, these proposals are believed to involve materials and techniques that are less understood for medical imaging than direct conversion a-Se layers, and to involve a number of direct challenges and solutions that still have to be proved.

It should also be noted that detectors with amorphous selenium vacuum deposited on thin film transistor array (TFT) using a thermal evaporation process such as the detector structure discussed in U.S. Pat. No. 5,319,206 can only be stored, transported or operated within a very narrow range of temperature. When the panel is subjected to temperatures close to the "glass transitional temperature" of selenium (i.e., 47 degrees C.), amorphous selenium gradually undergoes a phase change and slowly turns into microcrystalline selenium that has a totally different electrical property and is unsuitable for imaging use. These microcrystals normally first form near the pixel electrode and the higher conductivity of these microcrystals tend to "short circuit" adjacent pixels and therefore degrade the image quality (e.g., smearing the image). On the other temperature end, because of the difference between the thermal expansion coefficient of the glass substrate of TFT and the thermal expansion of selenium, below a certain temperature, such as 5 degree C., the selenium layer can physically be separated from the TFT substrate and opens the electrical contact between the two elements. This is called delamination and the detector is permanently damaged. Because of this, selenium coated TFT or the final detector unit must be kept above 5 degrees C., but operated below 40 degree C. and can only be transported using thermally insulated containers. Without proper care to these thermal conditions, detector panels can be damaged even being left out doors in winter time in most of the world, or can be damaged during air transportation if the panel is placed in the cargo space of a jet airplane for more than a few hours. In the past several years, many panels have been damaged this way.

Accordingly, it is believed that a need still remains to improve the conversion efficiency of flat panel x-ray imaging devices and the extension of temperature range for the storage, transportation, and operation of selenium over TFT. The invention of the present application is directed to meeting these needs.

BRIEF SUMMARY OF THE INVENTION

In a preferred example, a grid structure with material such as Benzocyclobutane (BCB) that can be tightly adhered to the TFT is added to the active matrix array before the selenium layer is deposited. The ridges of this waffle like grid structure can be aligned with the gates lines and the data lines of the underneath TFT structure to maximize the contact area of the pixel electrode to the selenium. The typical width of these ridges is in the order of 10 micrometers or matching the width the spacing between pixels and the height of these ridges could range from 5 to 20 micrometers. This added structure changes the contacting surface of TFT to selenium from an almost flat surface to a waffle like non-flat surface. Upon changes of temperature, the elasticity of BCB and the non-flat surface with more anchoring surface area allows the contacting interfaces of selenium to remain adhered to the TFT at a lower temperature. For the high temperature limit, these ridges also provide a barrier physically separating one pixel electrode from the next. In time, and during the gradual process of microcrystallization of amorphous selenium, these ridges provide additional electrical insulation between pixels that may be otherwise electrically bridged by the higher conductivity of microcrystalline selenium and resulted with signal cross-talk between pixels or image smear. The useful life of the imaging detector can then be extended.

With the further addition of a conducting grid embedded near the top of these ridges, the x-ray dose for a quality image can be significantly reduced by using charge multiplication effect of controlled avalanche process. This conducting grid provides an electrical potential that is just above the lower surface of the a-Se layer, and is at a voltage level sufficient to produce a high electric field between the grid level and the pixel electrode sufficient for avalanche charge multiplication. Because the distance between the grid and the pixel electrode is very small (e.g. about 5 to 15 µm), a practical voltage difference across it (e.g. about 500-1500 volts) creates a sufficiently high electric field (e.g. in the order of 100 V/µm) in the thin layer to cause avalanche charge multiplication. The thinness of that layer which is only 1 to 3 percent of the overall selenium thickness also takes away the concerns with errors due to depth-dependent gain. Most of the effect of converting x-ray to electrical charge occur at the 99 to 97 percent lower field region above this bottom high field region. The grid can be formed in using practical technology of layer and patterning that is well established in the semiconductor industry.

As a result, lower x-ray dose is required for the same image quality, thus reducing patient exposure. The lower dose required for imaging also reduces the number of trapped charge in the bulk of the selenium charge converting layer and thus reducing the ghosting effect known to the present in such x-ray imagers. Lower noise and high detector quantum efficiency (DQE) follow maintaining a high modulation transfer function (MTF). Because the grid potential directs all or nearly all of the holes to the pixel electrodes, the fill factor approaches 100%. Since in selenium, the threshold of electric field for the on-set of avalanche hole multiplication is in general lower than the threshold for electron multiplication, the charge gain from the avalanche effect in this structure can be limited to only the image charge of holes. Electrons injected from the TFT to selenium interface that contribute mostly to imaging noise do not undergo charge multiplication because of the requirement of higher electric field threshold for electron avalanche. And, the gain factor can be conveniently adjusted from unity (no gain) to ten or more for different imaging applications simply by changing the grid potential and thus the electrical field strength in the avalanche layer.

Two or more grids can be used, at respective voltage levels, thus effectively providing two or more avalanche layers with different characteristics. With two grids, the lower grid potential can be set to zero or even negative to reduce the electric field at the selenium to pixel electrode interface and therefore reduces the electron charge injection. The same proven readout electronics and readout scheme used as in the current selenium flat panel imagers commercially available, can be used in this detector with a grid structure.

A non-limiting example of a direct-conversion flat panel x-ray imager using these advances comprises a photoconductive layer (e.g. a-Se) locally generating electrical charges in response to x-ray exposure. An electrical grid extends laterally between the top and bottom surfaces of this layer to thereby divide it into upper and lower regions. A top electrode near the top of the layer is at a voltage level that creates a moderate electrical field in the upper region of the layer (e.g. 10 V/µm). The grid provides another potential plane that creates a higher electric field in the lower region of the layer (e.g. >75 V/µm). Collector electrodes under the layer are arranged in a pixel pattern, and readout electronics collect the desired signals in the manner used in the current flat panel selenium imager commercially available. In operation, the charges collected from the collector electrode are representative of the spatial distribution of the x-ray energy impinging on the layer. The term pixel is used here to denote a portion of the flat panel imager that can generate an electrical signal for a positionally corresponding display pixel on a screen displaying an x-ray image.

BRIEF DESCRIPTION OF SEVERAL VIEWS OF THE DRAWINGS

FIG. 3A is an isometric view of a portion of the waffle-like structure of the grid of the present invention;

FIG. 3B is an enlarged cross-sectional view of one of the grid members of FIG. 3A showing a portion of the grid electrode embedded therein;

FIG. 6 is an enlarged sectional view of the panel of the present invention including the grid using grid electrodes and illustrating the TFT interface;

FIG. 8 illustrates a zoom in view of the electric field near the charge collecting electrode and the grid of FIG. 7;

FIG. 9 illustrates a view similar to FIG. 6 using two grid electrodes in the grid;

FIG. 10 illustrates a zoom in view of the electric field near the charge collecting electrode of a two grid electrode used in the grid as shown in FIG. 9;

FIG. 10A is an enlarged cross-sectional view of one of the grid members of FIG. 10 showing a portion of at least two grid electrodes embedded therein; and FIG. 11 illustrates electrical field distributions over one of the openings shown in FIG. 6A.

DETAILED DESCRIPTION OF PREFERRED EMBODIMENTS

Figure 1:
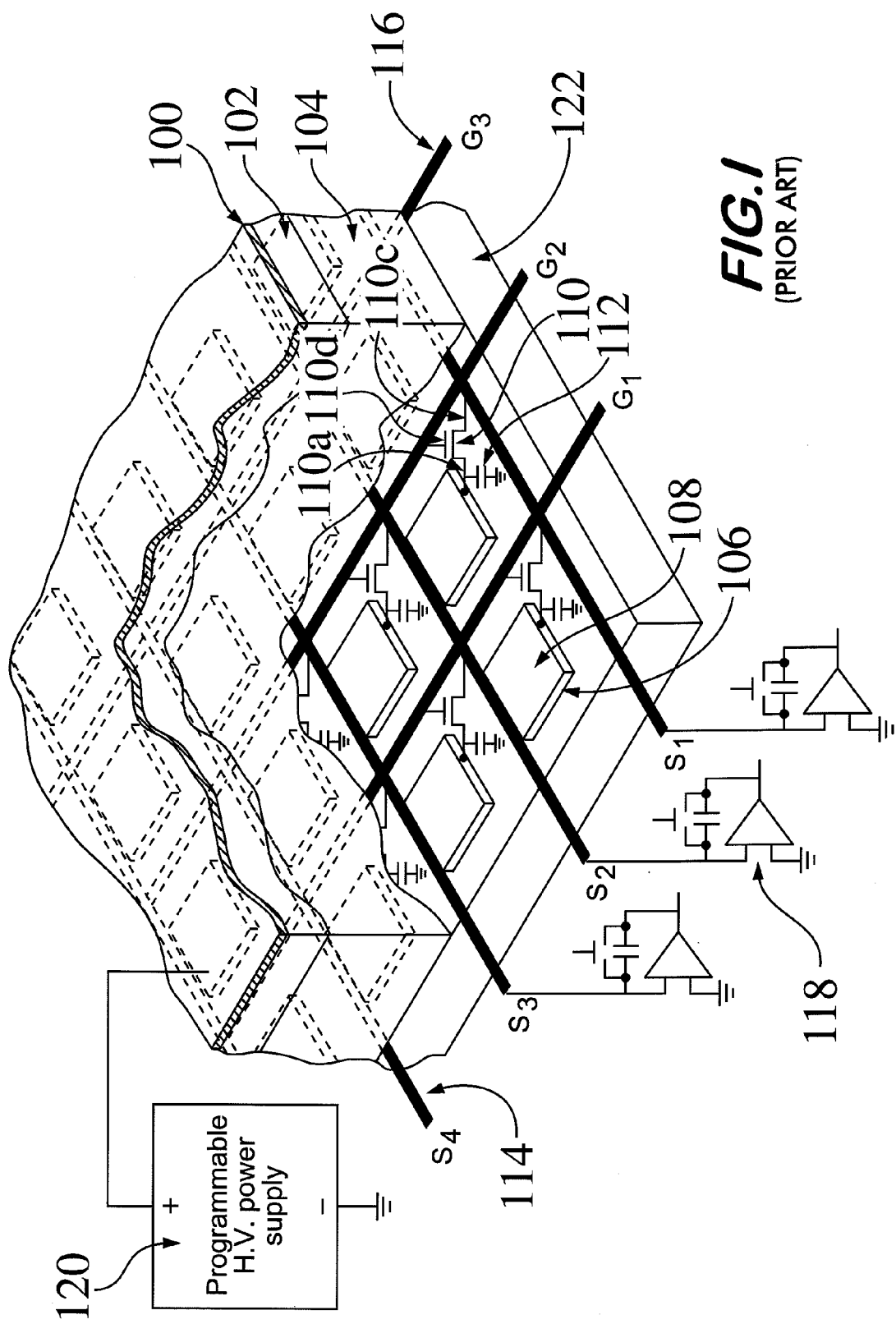
FIG. 1 depicts a prior art flat-panel x-ray detector shown isometrically in partial section.

FIG. 1 illustrates an overall structure of a flat panel x-ray imager currently available commercially, and is used to explain certain principles of operation. The terms x-ray receptor, x-ray detector, flat panel detector, and other terms may be used to refer to the same structure. The illustration is schematic and not to scale, and may not show all the elements of the panel that is currently available commercially. The x-rays come from above in this illustration, penetrate a top or upper electrode 100 and a separation layer 102 and enter an a-Se layer 104. Electrical charges resulting from the interaction in layer 104 are collected at charge collection electrodes or plates 106 which are in a pixel array and are covered by an electron blocking layer 108. A respective set of a thin-film transistor 110 and a signal storage capacitor 112 is connected to each transistor drain electrode and to the pixel charge collection electrode 106. A respective source line is connected to each transistor source of a row of transistors and a respective gate line 116 is connected to the gate of each transistor in a column of transistors. Source lines 114 are connected to respective charge amplifiers 118. A programmable high-voltage (H.V.) power supply 120 sets the desired voltage level a top electrode 100 (e.g. of the order of 3,000 Volts) The structure is built on a glass substrate 122.

Figure 2:
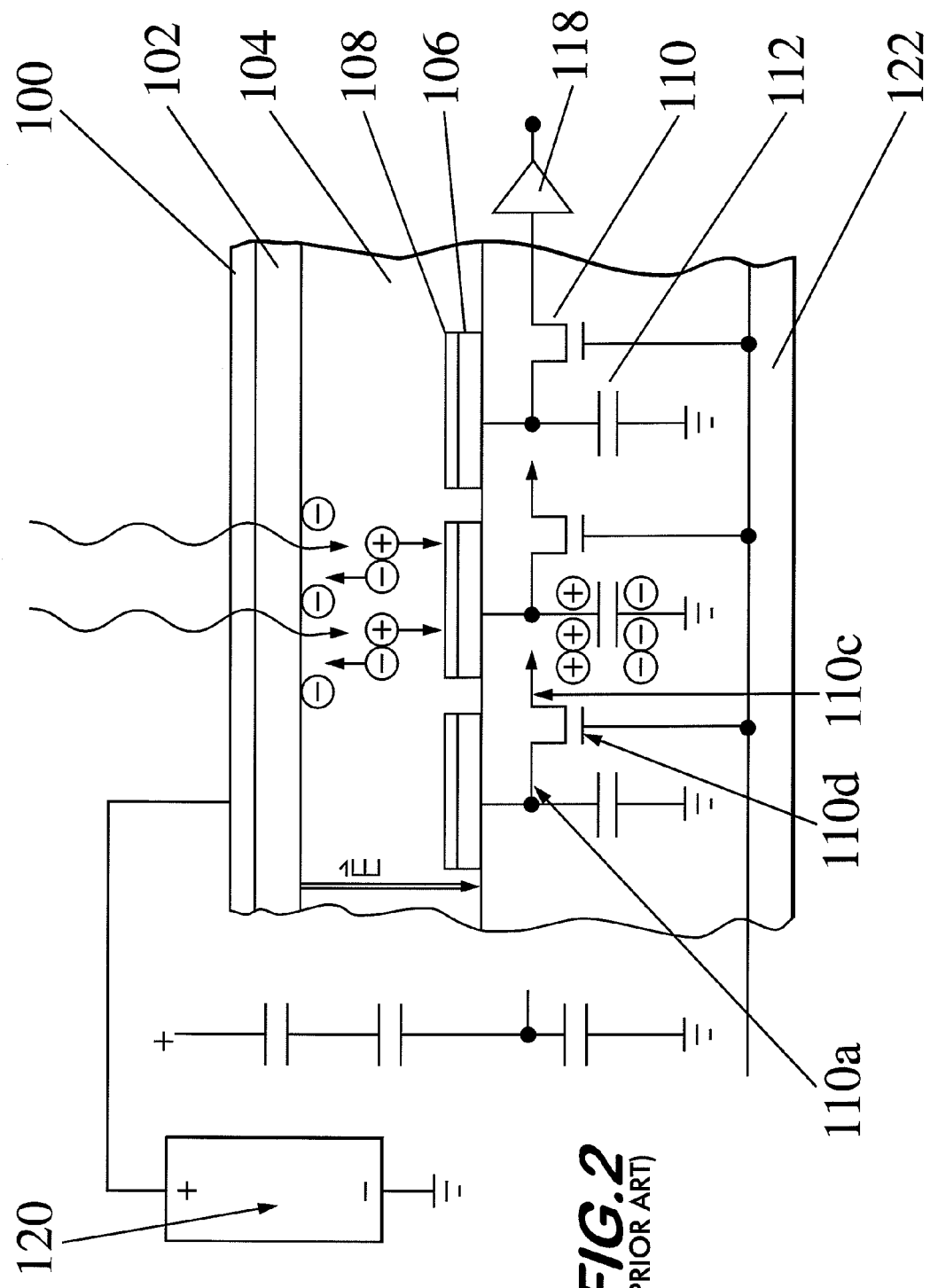
FIG. 2 illustrates a prior art partial sectional view of the panel of FIG. 1.

FIG. 2 illustrates a partial cross-section of the device of FIG. 1, and also is schematic and not to scale and may not show all elements of the panel. As illustrated, and as currently understood, x-ray energy entering photoconductor layer 104 generates electron-hole pairs, and the voltage difference between top electrode 100 and charge collection electrodes 106 directs the electrons up and the holes down. As a result, charges related to the holes collected at respective electrodes 106 are stored in signal storage capacitors 112, and are read out through charge amplifiers 118. As is well-known in the art, an electron blocking layer 108 is provided above the charge collection (pixel) electrode 106 to reduce electron injection (also known as "dark current") from the pixel electrode 106 into the photoconductor layer 104 that would normally occur at the amorphous selenium layer 104/pixel electrode 106 interface.

Figure 3:
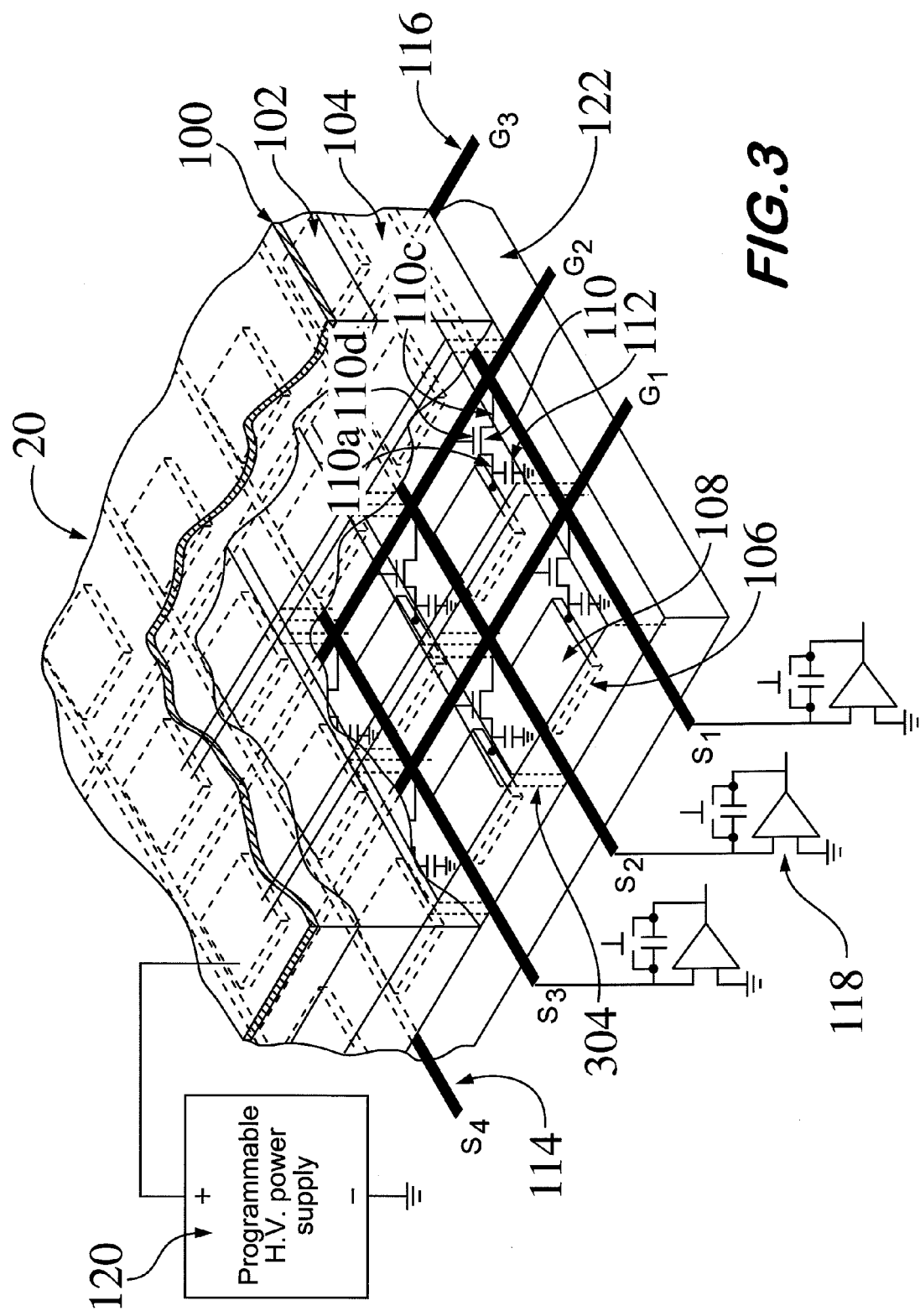
FIG. 3 illustrates the present invention using a grid on top of the space between the pixel electrodes to increase the contact surface area between selenium and TFT and shown isometrically in partial section.
Figure 4:
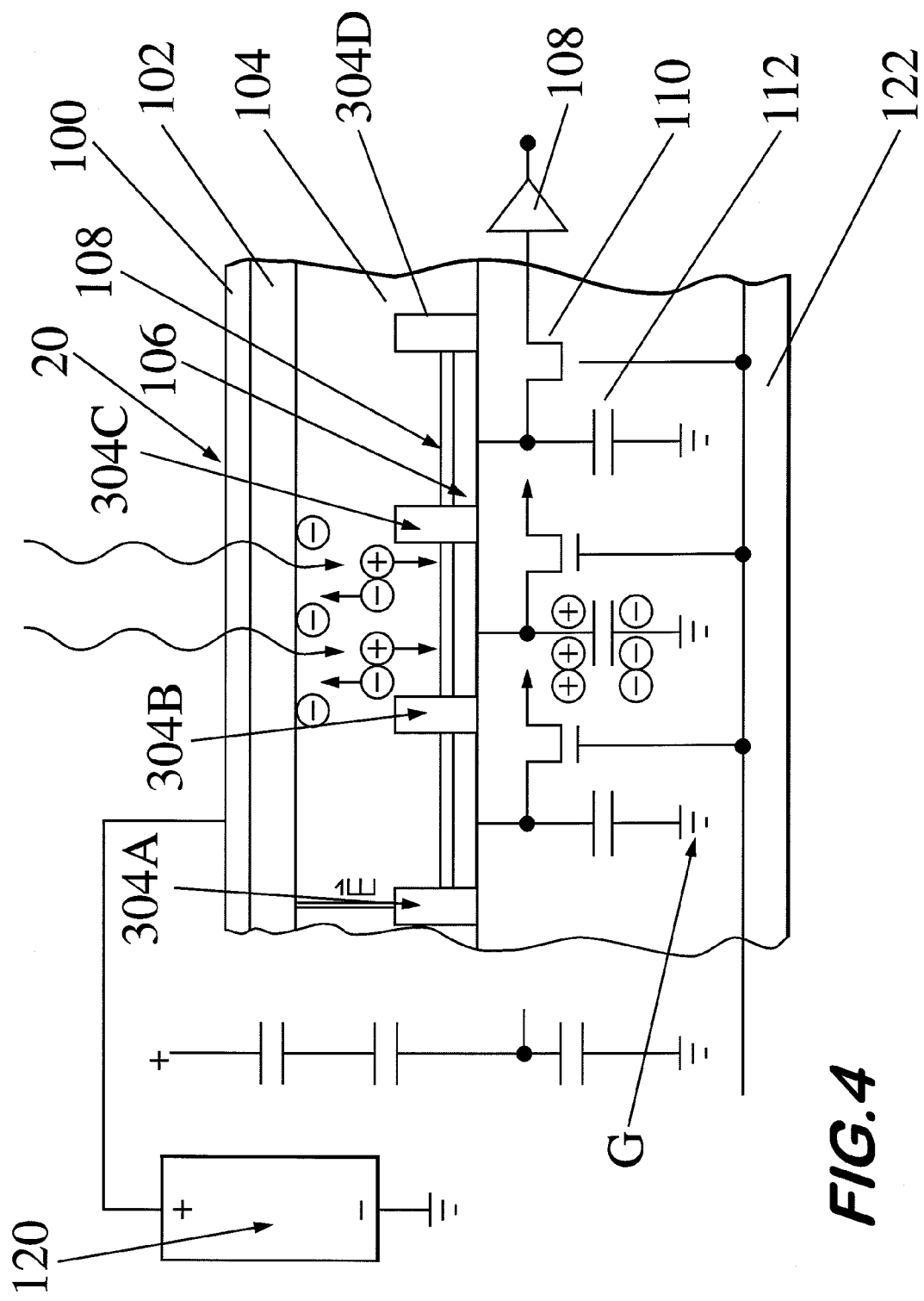
FIG. 4 is a partial section view of the flat-panel x-ray detector showing the grid members of the grid in the panel.

FIGS. 3 and 4 illustrate a partial view of the present invention 20 including a grid 304 comprising grid members 304A, 304B, 304C, 304D, etc., which form intersecting, vertical walls comprising a polymer material such as, but not limited to, BCB (Benzocyclobutane, which is commercially-available and used in the semiconductor industry) which extend up into layer 104. Thus, in the present invention 20, the thin film transistor layer 110 comprises a gate electrode 110d, a source electrode 110c, and a drain electrode 110a connected to the charge collection electrode 106, the electron blocking layer 108 and the grid 304, the latter of which forms the upper portion of the thin film transistor layer 110. As shown most clearly in FIG. 3A, the grid 304 forms an orthogonal waffle-like grid structure with openings aligned with the pixel electrodes 106. By way of example only, the height of these grid members 304A-304D may preferably be from 5 micrometers to 20 micrometers, although smaller or larger grid member sizes can also be used. It should be noted that the notation of grid members 304A-304D is by way of example only and that the grid 304 is not limited, in any way, to only four intersecting members to form a grid. Any number of intersecting members to form the grid 304 is within the broadest scope of the present invention 20.

It should be understood that the waffle-like structure of the grid 304, with or even without the grid electrodes 306 (as will be discussed further below) included therein provides a solution to a basic problem of the detector using selenium. In particular, the presence of the waffle-like structure grid 304 using the polymer material (e.g., BCB) extends the temperature range of the present invention. When conventional X-ray imager panels are subjected to higher than room temperatures (e.g., 40-47 degrees C.), the rate of microcrystallization of the selenium is greatly increased, resulting in undesirable electrical bridging of the pixel electrodes 106. However, the presence of the vertically-extending wall of each grid member 304A, 304B, 304C, etc., provides an additional physical barrier between pixel electrodes 106 and therefore minimizes the direct electrical bridging of the pixel electrodes 106 as the temperature increases. Certainly, as the height of each grid member 304A is increased (i.e., how far it extends upward into the photoconductor layer 104), the ability to minimize the undesirable electrical bridging also increases.

Moreover, because the selenium layer 104 and the TFT layer 110 have thermal expansion coefficients that differ by a factor of ten (i.e., $37 \times 10^{-6}$/degree Centigrade for selenium and $37.6 \times 10^{-7}$/degree Centigrade for the glass (e.g. 1737F) used in the TFT layer 110) the contact between these two layers can be lost by temperature variations. Not only does this loss of contact between the layers degrade performance, but it also permits the intrusion of air therein to aggravate this separation. In contrast, by having the grid 304 comprising a polymer material (e.g., BCB) form the upper portion of the thin film transistor layer 110, that is more elastic than the charge collection electrode 106 portion of the thin film transistor layer 110, the strong adhesiveness of BCB to the TFT substrate is created and together with the elasticity of BCB and the non-flat structure of this waffle structure grid 304, the grid 304 provides a good anchor to the selenium layer 104, as well as a "cushion" for thermal expansion or contraction of the pixel electrode 106 (i.e., the TFT layer 110 in general). As a result, the delamination (which usually occurs at low temperatures, e.g., approximately 5 degrees C., for these types of panels) temperature can be lowered using the present invention 20. Thus, as a result of using the grid 304 in the present invention 20, with or without the grid electrodes 306, the temperature range of the selenium detector is extended and further prolongs the panel's useful life in operation. This feature is very important not only during the operation of the panel but also during its shipping and handling.

Figure 5:
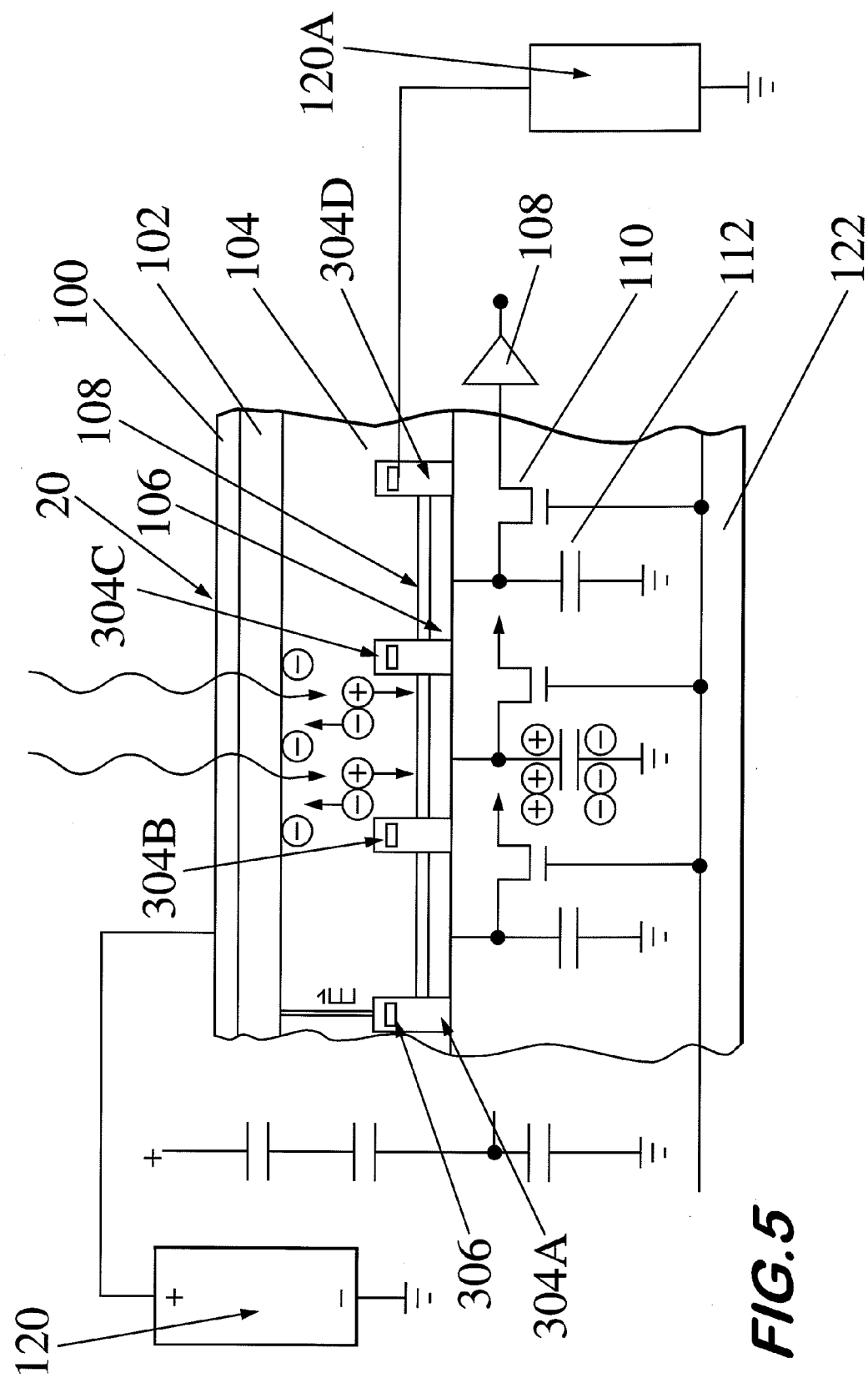
FIG. 5 illustrates an embodiment of the present invention using the grid structure of FIG. 4 but also including a grid electrode within the grid structure to increase the electrical field in a lower region of a photoconductive layer.

FIG. 5 depicts the grid 304 of FIG. 4 but which also includes a grid electrode 306 made of an electrically conductive material that is at or near the top of the grid members 304A, 304B, 304C, 304D, etc. FIG. 5 thus illustrates this additional feature of the present invention 20 wherein a grid electrode 306 is disposed throughout the grid 304; thus the grid electrode 306 is similar to the grid structure 304 and is present in the longitudinal and transverse members of the grid 304 shown in FIG. 3A if a grid were used in that figure. As mentioned earlier, the grid members 304A, 304B, 304C, 304D, etc., comprise a polymer (e.g., BCB) that acts as an insulator and as a dielectric support (see FIG. 6). The grid electrode 306 is completely embedded within the grid members 304A, 304B, 304C, 304D, etc., (see FIG. 3B) and is surrounded on all sides by the polymer. As a result, all edges of the grid electrode 306 are covered by the insulative polymer and there is no electrical contact with the photoconducting layer 104. It should be understood that although the grid electrode 306 is shown disposed near the upper edge of the grid members 304A, 304B, 304C, 304D, etc., this is by way of example only and is not restricted to that portion of the grid members 304A, 304B, 304C, 304D, etc. The grid electrode 306 may be coupled to the programmable high voltage power supply (as shown in FIG. 3) through a voltage divider (not shown) or a dedicated power supply 120A. The power source of the grid electrode 306 does not form any limitation to the present invention whatsoever. As mentioned earlier, the grid electrode 306 is continuous throughout the grid 304 and it should be understood that the connection to the power supply 120/120A at one location of the grid electrode 306 (e.g., see grid electrode 306 in grid member 304D in FIG. 5) energizes the grid electrode 306 throughout the grid 304 as an equipotential electrode. The collector plate 106 is not entirely flat but includes a downward-projecting member 300 to electrically connect to a drain electrode 110a of a thin film transistor 110 whose source electrode 110c connects to a source line 114 (FIG. 3) leading to a source pad (not shown) that, in turn, is connected to signal processing circuitry (also not shown). The grid member 304A extends upward from the space in-between electrode 106. As mentioned earlier, the electrically conductive grid electrode 306 is surrounded by polymer material (e.g., BCB) of the grid members 304A, 304B, 304C, 304D, etc. The grid members 304A, 304B, 304C, 304D, etc., along with the grid electrode 306 therein, form a waffle-shaped structure (see FIG. 3A). Again, by way of example only, when the height of the photoconductor layer 104 is of the order of 500 micrometers, the height of grid members 304A, 304B, 304C, 304D, etc., may be of the order of 5-20 micrometers (although the grid members 304A, 304B, 304C, 304D, etc., height is not limited in any way to that range), with the conducting grid electrode 306 being positioned at or near the top of grid members 304A, 304B, 304C, 304D, etc., e.g., within a micrometer or within a few micrometers down from the top edge of the grid members 304A, 304B, 304C, 304D, etc. However, as mentioned earlier, this position does not in any way limit the scope of the present invention 20. For example, the electrode 306 can be positioned anywhere within the grid members 304A, 304B, 304C, 304D, etc and, as will be discussed shortly, the presence of at least a second grid electrode supports the feature of positioning the grid electrode 306 at different locations within the grid member 304A, 304B, 304C, 304D, etc.

FIG. 6 illustrates the grid and its support structure with four openings 400 for each charge collecting electrode 106. In FIG. 6, charge collector electrode 106 has a portion that connects to a drain electrode 110a of thin-film transistor 110, and a portion that is over the channel 110b of the transistor and partly over a source electrode 110c that connects to a source pad (not shown) leading to signal processing circuitry (also not shown). Photoconductor layer 104, such as a-Se, has a bottom surface immediately above electrode 106 (and may be separated there from by an electron blocking layer 108 as shown in FIG. 4 and as discussed earlier), and which includes a downwardly-extending member 300. Thus, the collector electrode 106 is not entirely flat but includes the downwardly-extending member 300 to connect electrically to a drain electrode 110a of the thin film transistor 110 whose source electrode 110c connects to a source line 114 leading to a source pad (not shown) that in turn to signal processing circuitry (also not shown). FIG. 6 thus illustrates an example of the present invention 20, as seen in a vertical section through a collector plate 106 that is at a lateral end of the array of plates 106 forming the lower charge collection electrode 106. The gate electrode of the TFT 110 is shown by 110d. As also mentioned earlier, the electrically conductive grid electrode 306 is surrounded by the polymer material (e.g., BCB) of each grid member 304A, 304B, 304C, 304D, etc., and wherein all of the grid members 304A, 304B, 304C, 304D, etc., form the waffle-shaped structure. The conductive grid electrode 306 may be less than a micrometer thick but is not limited to that thickness in any way whatsoever.

The deposition of amorphous selenium material on top of the grid 304 fills the openings between the grid members 304A, 304B, 304C, 304D, etc., and also on top of the grid members 304A, 304B, 304C, 304D, etc. As also mentioned earlier, since the adhesion between the TFT 110 and the polymer material (e.g., BCB) of the grid 304, is normally strong and more elastic, the grid structure 304 provides a strong mechanical anchor to the selenium layer 104 and allows the attachment of the selenium layer to the TFT 110 over a wider range of temperature.

Figure 6A:
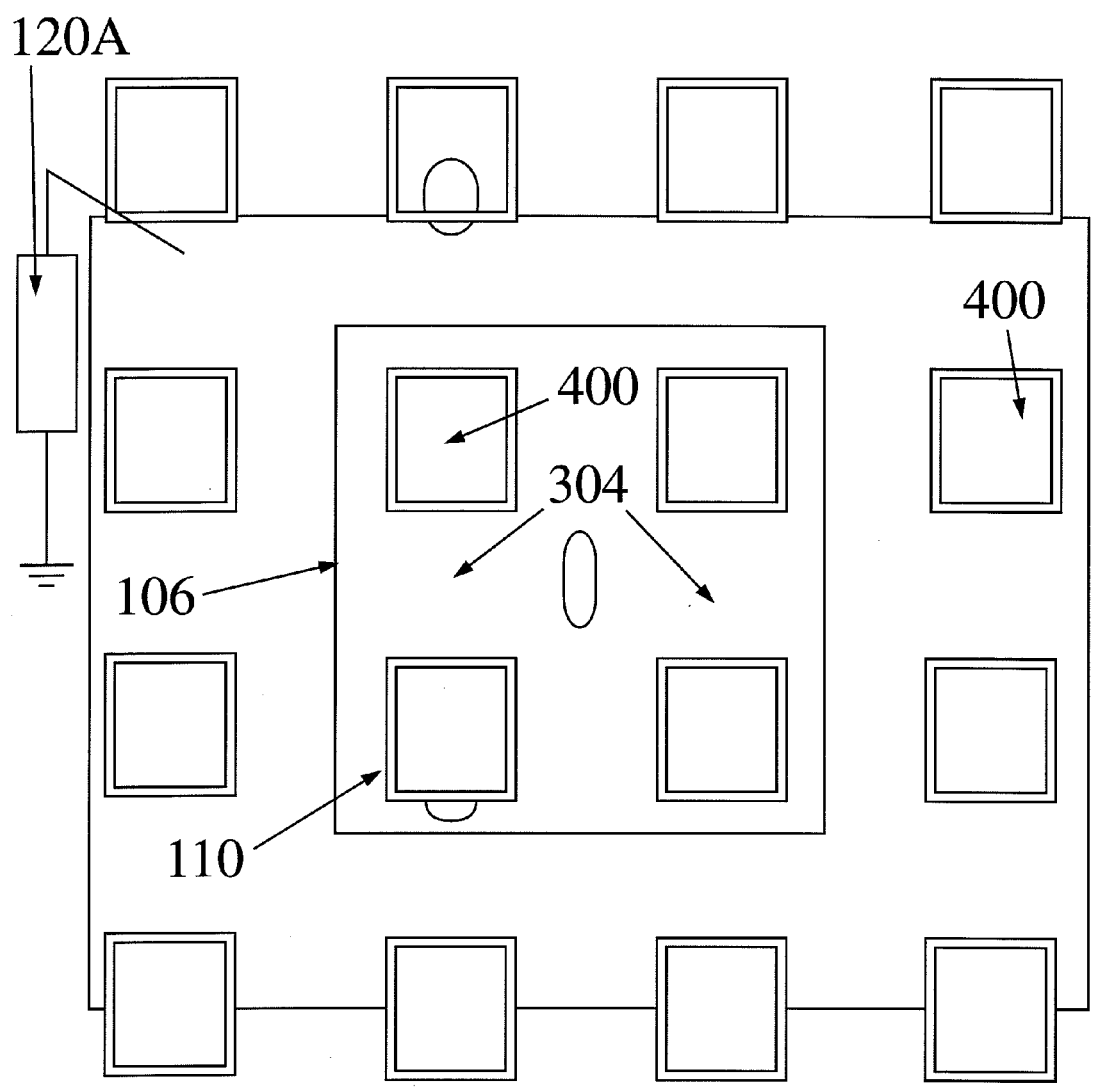
FIG. 6A is a top plan view of a portion of the grid structure showing four openings for each pixel.

As illustrated in the simplified plan view of FIG. 3A, the grid members 304A form a waffle-like structure. As shown most clearly in FIG. 6A, a portion of the grid structure 304 provides four openings 400 (see also FIG. 6) to each collector electrode 106 where the selenium layer 104 is extended to be in contact with the pixel charge collection electrode 106. FIG. 6 illustrates a currently preferred embodiment in which ridges 304, with one or more grid electrodes 306 therein, surrounding each collector plate 106 and divided into four areas. As seen in FIG. 6, grid members 304A, 304B, 304C, 304D, etc., (with one or more grid electrodes 306 therein) intersect at a central area of the collector electrode 106 that is shown in the center of the figure and other grid members 304A, 304B, 304C, 304D, etc., with grid electrode(s) 306 therein surround the same collector electrode 106. In the example of FIG. 6, the approximate dimensions of a collector electrode 106 are 70 by 70 micrometers.

Figure 7:
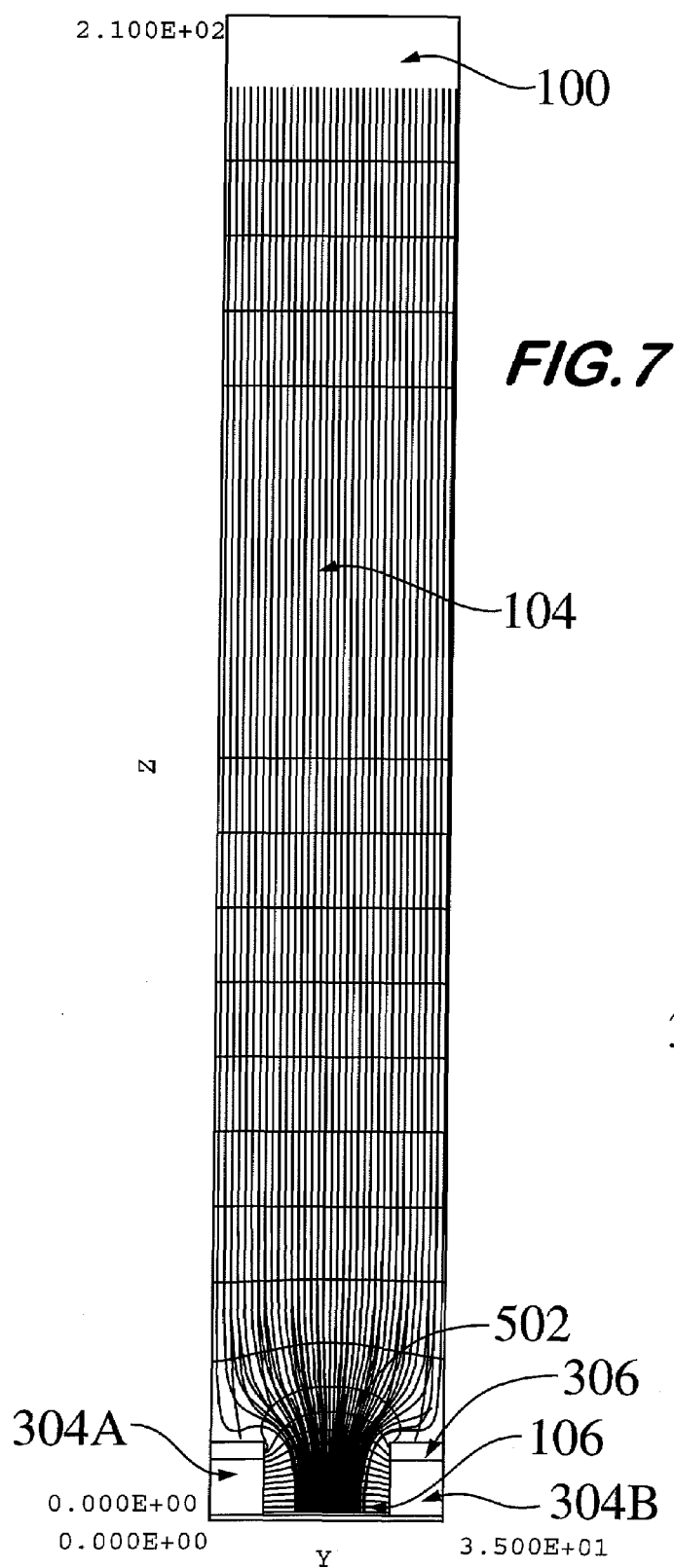
FIG. 7 illustrates a computer simulation of the electric field lines over one of the four openings of FIG. 6 with an electrical potential applied to the grid electrode.
Figure 7A:
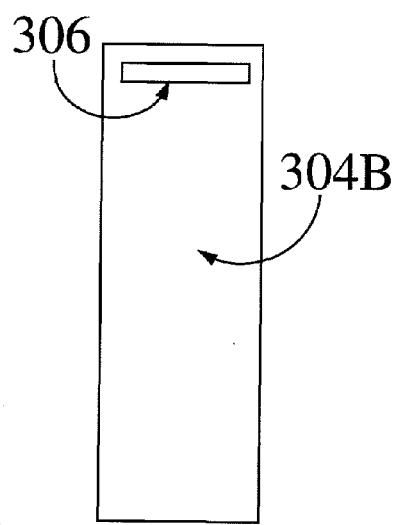
FIG. 7A is an enlarged cross-sectional view of one of the grid members of FIG. 7 showing a portion of the grid electrode embedded therein.
Figure 7B:
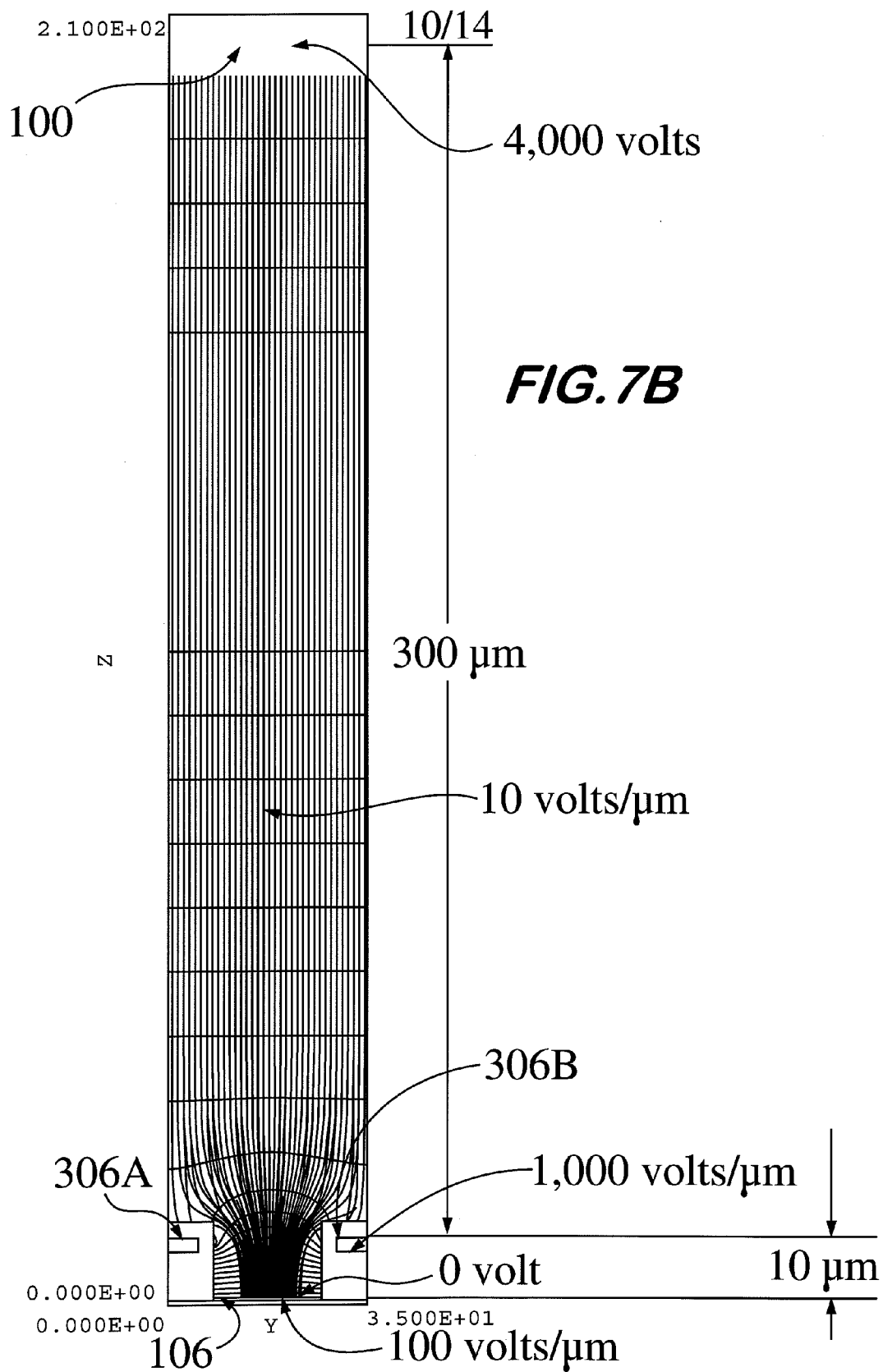
FIG. 7B is a computer simulation of the electric field lines similar to that shown in FIG. 7 but using exemplary layer thicknesses and applied voltages for depicting the different electric field strengths.

FIG. 7 illustrates how the grid 304 is believed to affect the electric field in the photoconductor layer 104; FIG. 7A provides a more accurate depiction of the grid electrode 306 embedded within the grid members (e.g., grid member 304B). It is a section through an x-ray imager panel using the present invention 20, but FIG. 7 is simplified in comparison to FIG. 6 in order to focus on a particular aspect of the present invention 20. As earlier noted, the voltage at the upper electrode 100 is different from the voltage at the grid electrode 306 in order to make the electric field in a lower region of the selenium-based layer 104 (e.g., the portion below grid 304) significantly higher than the electric field in an upper region of the layer 104 (e.g., the region above grid 304). This can be seen in FIG. 7 where the electric field line density in the upper portion of layer 104 is less than the electric field line density just above and between the grid members 304A and 304B. By way of example only, and as shown in FIG. 7B, if the top electrode 100 is at 4000 Volts relative to the collector plates 106, while the voltage at the grid electrode 306 relative to the collector plates 106 is approximately 1000 Volts, and if the selenium layer is approximately 300 micrometers and the grid 304 is approximately 10 micrometers in height, then the electric field in the upper region of the selenium layer 104 is approximately 10V/micrometer whereas the electric field in the lower region of the selenium layer is approximately 100V/micrometer. The higher electric field in the lower region of layer 104 has two effects that are particularly significant: it directs the charges (generated in layer 104 from interaction with x-rays) toward central areas of collector plates 106, and it provides conditions favoring electrical charge avalanching at the lower region of the layer 104, and consequent increase in the signal-to-noise ration (SNR), i.e., the electrical signal from a collector plate 106 generated in response to a given amount of x-ray energy impinging on the imager panel portion that is vertically aligned with that collector plate 106. Lines 502, created by a computer simulation of pertinent parameters, illustrate a possible distribution of the electric field in layer 104.

FIG. 8 illustrates an enlarged view of FIG. 7 near the region of the grid 304 and the charge collector plate 106.

FIG. 9 illustrates an example in which the grid 304 comprises of two grid electrodes 306A and 306B each of which can be at a respective voltage level since these two electrodes are insulated from one another. As mentioned earlier with respect to one grid electrode 306, because all edges of each grid electrode 306A and 306B are covered by the insulative polymer there is no also electrical contact of these grids 306A/306B with each other nor with the photoconducting layer 104. It should be understood that the number of grid electrodes is not limited to one or two, but can one or any plurality of grid electrodes. Each grid electrode 304A, 304B, etc., can again be at a different voltage level, thereby shaping the electric field to a desired pattern for controlled avalanche events. The dimensions and materials identified in FIG. 9 pertain to a particular example and are not to be taken as a limitation on the scope of the present invention 20. FIG. 9 also illustrates examples of the heights of the grid members 304A, 304B, 304C, etc., in micrometers, above the zero level of the (main portion of) collector plate 106. The thickness (in the vertical direction) of the grid member 304A, 304B, 304C, etc., is less than the figure may suggest. The actual thickness of the conducting grid electrode 306A, 306B, etc., typically is less than a micrometer.

FIG. 10 is similar to a portion of FIG. 8 but illustrates the electrical field lines in a computer simulation of a structure that uses two grid electrodes 306A and 306B embedded in the grid members 304A, 304B, 304C, etc. Lines 602 and 604, from a computer simulation, illustrate a possible configuration of the electric field in layer 104. Only a part of the vertical extent of photoconductor layer 104 is illustrated. The heights of grid electrodes 306A and 306B above the major surface of charge collection electrode 106 can be, for example, 16 and 21 micrometers, respectively. Top electrode 100 (not visible in FIG. 9) can be at, e.g. 4,000 Volts, grid 306A can be at, e.g. 0 Volts and grid 306B can be at, e.g. 2,000 Volts. The grid voltages can be adjusted such that the electric field lines are just inside the lateral walls of grid members 304A, 304B, 304C, etc.

FIG. 11 illustrate results generated from computer simulation of the geometry illustrated in FIG. 6 and pertain to electric field parameters related to a quadrant of a collector plate or electrode 106, when the upper electrode 100 is at 3000 Volts and the grid electrode 306 is at 1250 Volts (in a configuration such as illustrated in FIGS. 5 and 6). FIG. 11 illustrates the electric field at a plane that is parallel to the major surface of a collector electrode 106 and is at the indicated height Z (e.g., 2.1 microns over the opening 400) in micrometers. The directions X-Y are in the plane of the quadrant of the plate 106, and are in micrometers. The electric field at the contours labeled A through X is in units of electric field strength. FIG. 7 and FIG. 8 pertain to the same conditions, but illustrate the field lines in a vertical section through the geometry of FIG. 6. FIG. 8 illustrates a zoom in portion of the field lines near the charge collection electrode 106 and the grid electrode 306 of FIG. 6.

The basic new feature of the present invention 20 is a waffle-like grid structure 304 with one of the major benefits being the extension of the temperature range of the panel. When one or more conducting grid electrodes 306 are embedded in this grid structure 304, the selenium layer 104 can be partitioned into two regions, the upper low electric field region (97 plus percent) can be used for image charge conversion and the lower high field region can be used for charge multiplication or signal gain.

The present invention 20 disclosed by way of examples above can be made using process known in the semiconductor industry. For example, the process used to make the x-ray imager panels currently available commercially can be modified by introducing several processing steps just before the deposition of the photoconductor layer 104 over the thin film transistor panel. In particular, just before depositing the photoconductor layer 104, a thin layer of BCB is formed over the already completed thin film structure, in the manner known in the semiconductor industry, e.g. a BCB layer 10-30 micrometers thick. A thin layer of an electrical conductor, e.g. Cu, Al, or a metal alloy, e.g., less than a micrometer thick, is formed over the BCB layer. To ensure that the grid electrode 306 is insulated on all sides within the BCB layers, the hole in the electrical conductor layer (to form the grid electrode 306) is patterned (e.g., etching using photolithography) first. Next, a thinner (e.g., less than a couple of microns) layer of BCB is formed over the conductor layer. The layers of polymer (i.e., the top and bottom layers of BCB) are then patterned (e.g., etched using photolithography) into the desired structure of the grid 304 to form the openings 400. Because the openings 400 are smaller than the openings formed in the electrical conductor layer, the grid electrode 306 is totally encompassed within the grid structure 304. It should be understood that when this process is completed, the grid 304 forms the upper portion of the thin film transistor layer 110.

Where a plurality of grid electrodes 306A, 306B, etc., is to be included within the grid 304, this process is repeated whereby each time an electrical conductive layer is deposited, the very next step is to pattern the hole in that electrical conductive layer to form the particular grid electrode. The next layer of BCB is then deposited on top of that without patterning, the next electrical conductive layer is then patterned to form the next grid electrode and then another layer of BCB is deposited on top of that layer. If there are no further grid electrodes to be formed, then all of the BCB layers are then patterned (e.g., etched using photolithography) at the same time, thereby forming vertically aligned openings 400 in the grid structure 304 and hence the waffle-like appearance with a plurality of insulated grid electrodes 306 embedded therein. As mentioned previously, when this process is completed, the grid 304 forms the upper portion of the thin film transistor layer 110.

It should be understood that the term "grid" as used throughout this Specification is not limited to orthogonally-intersecting grid members such as that shown and described as a "waffle-like" structure but includes any type of intersecting members wherein the upper portion of the thin film transistor layer 110 comprises the grid 340 which includes openings 400 to permit hole/electron migration through the openings 400 of the grid 304.

While the invention has been described in detail and with reference to specific examples thereof, it will be apparent to one skilled in the art that various changes and modifications can be made therein without departing from the spirit and scope thereof.

What is claimed is:

1. A flat panel X-ray imager including a top electrode, a photoconducting layer for converting X-ray energy to electron-hole pairs, a thin film transistor layer having a gate electrode, a source electrode and a drain electrode coupled to a charge collection electrode, and a glass substrate, the flat panel X-ray imager being coupled to a power supply to generate a first electric field between the top electrode and the charge collection electrode, said thin film transistor layer further comprising:
an upper portion comprising a grid, said grid comprising grid members that intersect to form openings that permit hole and electron movement to the charge collection electrode and wherein said grid expands and contracts with said thin film transistor layer during temperature changes.

2. The flat panel X-ray imager of claim 1 wherein said grid members comprise a polymer.

3. The flat panel X-ray imager of claim 2 wherein said polymer comprises benzocyclobutane.

4. The flat panel X-ray imager of claim 1 wherein said photoconducting layer comprises amorphous selenium.

5. The flat panel X-ray imager of claim 1 wherein said grid members intersect one another orthogonally.

6. The flat panel X-ray imager of claim 1 wherein said grid further comprises a first grid electrode embedded within said grid members and formed of an electrically conductive material, said first grid electrode being electrically energized to generate a second electric field, greater than said first electric field, to form an avalanche charge gain region within a portion of said photoconductive layer.

7. The flat panel X-ray imager of claim 6 further wherein said first grid electrode is embedded adjacent a top portion of each of said grid member.

8. The flat panel X-ray imager of claim 6 wherein said grid further comprises a second grid electrode embedded within said intersecting members and formed of an electrically conductive material, said second grid electrode being electrically insulated from said first grid electrode, said second grid electrode being electrically energized to generate a third electric line density, less than said second line density, of the electric field to minimize electron injection from said charge collection electrode.

9. The flat panel X-ray imager of claim 8 wherein said second grid electrode is at a voltage of substantially 0 volts.

10. The flat panel X-ray imager of claim 8 wherein said second grid electrode is located below said first grid electrode.

11. The flat panel X-ray imager of claim 8 wherein said grid comprises three or more grid electrodes wherein each of said gain grid electrodes are electrically insulated from each other and from the photoconducting layer.

12. A method for extending the temperature range of a flat panel X-ray imager, wherein the X-ray imager includes a top electrode, a photoconducting layer for converting X-ray energy to electron-hole pairs, a thin film transistor layer having a gate electrode, a source electrode and a drain electrode coupled to a charge collection electrode, and a glass substrate, said method comprising the steps of:
forming a layer of a polymer over the thin film transistor before depositing the photoconducting layer over the thin film transistor; and
patterning said layer of polymer to form a grid structure with openings to the charge collection electrode;
depositing said photoconducting layer over said patterned layer of polymer; and
applying the top electrode layer to form the X-ray imager.

13. The method of claim 12 wherein said polymer comprises benzocyclobutane.

14. The method of claim 13 wherein said layer of benzocyclobutane is approximately 10-30 micrometers thick.

15. The method of claim 12 wherein said step of patterning comprises form a waffle-like structure to form said grid.

16. The method of claim 12 wherein said photoconducting layer is amorphous selenium.

17. A method of improving the conversion efficiency of a flat panel X-ray wherein the X-ray imager includes a top electrode, a photoconducting layer for converting X-ray energy to electron-hole pairs, a thin film transistor layer having a gate electrode, a source electrode and a drain electrode coupled to a charge collection electrode, and a glass substrate, said method comprising the steps of:
(a) forming a first layer of a polymer over the thin film transistor before depositing the photoconducting layer over the thin film transistor;
(b) forming a first layer of an electrical conductor over said polymer layer;
(c) patterning said first layer of an electrical conductor;
(d) depositing a second layer of polymer over said first layer of electrical conductor formed into said grid electrode;
(e) patterning said layers of polymer to form a grid structure with openings to the charge collection electrode;
(f) depositing said photoconducting layer over said grid structure;
(g) applying the top electrode layer to form the X-ray imager; and
(h) arranging said first layer of electrical conductor to be electrically energized.

18. The method of claim 17 wherein said polymer comprises benzocyclobutane.

19. The method of claim 18 wherein said layer of benzocyclobutane is approximately 10-30 micrometers thick.

20. The method of claim 17 wherein said step of patterning said layers of polymer comprises forming a waffle-like structure to form said grid.

21. The method of claim 17 wherein said photoconducting layer is amorphous selenium.

22. The method of claim 17 wherein said electrical conductor layers comprise copper or aluminum or any other metal alloy.

23. The method of claim 22 wherein said electrical conductor layer is less than a micrometer thick.

24. The method of claim 17 further comprising the steps of:
  (h) depositing another layer of electrical conductor on said second layer of polymer after step (d);
  (i) patterning said another layer of electrical conductor on said second layer of polymer to form another grid electrode;
  (j) depositing a third layer of polymer over said another layer of electrical conductor which forms another grid electrode
  (j) repeating steps (h)-(j);
  (k) patterning all of said layers of polymer to form a grid structure with openings to the charge collection electrode;
  (l) depositing said photoconducting layer over said grid structure;
  (m) applying the top electrode layer to form the X-ray imager;
  (n) arranging each of said grid electrodes to be electrically energized at respective voltage levels.

25. The method of claim 24 wherein said polymer comprises benzocyclobutane.

26. The method of claim 25 wherein said layer of benzocyclobutane is approximately 10-30 micrometers thick.

27. The method of claim 24 wherein said step of patterning said layers of polymer comprises forming a waffle-like structure to form said grid structure.

28. The method of claim 27 wherein said photoconducting layer is amorphous selenium.

29. The method of claim 24 wherein each of said electrical conductor layers comprises copper or aluminum or any other metal alloy.

30. The method of claim 29 wherein each of said electrical conductor layers is less than a micrometer thick.

* * * * *